(12) United States Patent
Scheuerman et al.

(10) Patent No.: US 8,447,448 B2
(45) Date of Patent: May 21, 2013

(54) AUTOMATED GUIDED VEHICLE

(75) Inventors: Robert J. Scheuerman, Washington, MI (US); William O. Merkle, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 12/612,921

(22) Filed: Nov. 5, 2009

(65) Prior Publication Data

US 2011/0106352 A1    May 5, 2011

(51) Int. Cl.
*G05D 1/00* (2006.01)
*B60W 10/20* (2006.01)

(52) U.S. Cl.
USPC ............... 701/22; 701/23; 701/301; 180/168

(58) Field of Classification Search
USPC .......... 701/22, 23, 26, 41, 300, 301; 180/168, 180/167
See application file for complete search history.

(56) References Cited

U.S. PATENT DOCUMENTS

| | | | | |
|---|---|---|---|---|
| 4,345,662 A * | 8/1982 | Deplante | ....................... | 180/168 |
| 4,990,841 A * | 2/1991 | Elder | ............................ | 318/587 |
| 5,163,001 A * | 11/1992 | Luke, Jr. | ......................... | 701/23 |
| 5,377,106 A * | 12/1994 | Drunk et al. | ..................... | 701/25 |
| 5,913,919 A * | 6/1999 | Bauer et al. | ................... | 701/301 |
| 5,961,559 A * | 10/1999 | Shimbara et al. | ............... | 701/23 |
| 6,515,614 B2 * | 2/2003 | Sakai et al. | ..................... | 342/70 |
| 6,721,638 B2 * | 4/2004 | Zeitler | ............................. | 701/23 |
| 8,036,775 B2 * | 10/2011 | Matsumoto et al. | .......... | 700/253 |
| 2010/0025131 A1 * | 2/2010 | Gloceri et al. | ............. | 180/65.28 |

* cited by examiner

*Primary Examiner* — Tan Q Nguyen

(57) ABSTRACT

A vehicle for transporting material along a defined path includes a chassis, a source of electric power mounted on the chassis, a traction system including a traction motor connected to the power source for driving wheels supporting the chassis, a steering system including steering motor connected to the power source for adjusting an angular position of a steerable wheel supporting the chassis, and a controller for adjusting the vehicle's speed and direction by controlling operation of the traction motor and steering motor in response to information regarding the vehicle's location and travel direction relative to the path.

20 Claims, 3 Drawing Sheets

AUTOMATED GUIDED VEHICLE

BACKGROUND OF INVENTION

The present invention relates generally to an apparatus for transporting material or components. More particularly, the invention relates to an automated guided vehicle for transporting material and components under computer control between locations on a factory floor.

Various techniques used to transport material and components between workstations on a factory floor include conveyors such as conventional belt conveyors, fork trucks and manned tuggers. A preferable technique would provide an adjustable, guided path that would be traversed by an unmanned vehicle operating under computer control. The algorithm that would control the vehicle should provide for easy modifications that would accommodate changes in location of the work stations, equipment additions, and assignment of the vehicle to a new work environment.

Preferably an automated guided vehicle for this purpose would be manufactured a minimal cost and could carry its own power supply, traction drive and steering system and an on-board computer that would respond to commands from a central computer system and control various motors that actuate the vehicle's steering and drive systems.

SUMMARY OF INVENTION

A vehicle for transporting material along a defined path includes a chassis, a source of electric power mounted on the chassis, a traction system including a traction motor connected to the power source for driving wheels supporting the chassis, a steering system including steering motor connected to the power source for adjusting an angular position of a steerable wheel supporting the chassis, and a controller for adjusting the vehicle's speed and direction by controlling operation of the traction motor and steering motor in response to information regarding the vehicle's location and travel direction relative to the path.

The vehicle and its operating systems are assembled readily and installed easily in the vehicle's chassis at low cost and without a high degree of technical complexity and sophistication, such as precision jigs or fixtures. The computer control system would provide an open architecture permitting the control algorithm to be modified easily and quickly to accommodate various work assignments.

The vehicle provides a high level of capability and flexibility that surpasses alternative transportation techniques.

The scope of applicability of the preferred embodiment will become apparent from the following detailed description, claims and drawings. It should be understood that the description and specific examples, although indicating preferred embodiments of the invention, are given by way of illustration only. Various changes and modifications to the described embodiments and examples will become apparent to those skilled in the art.

DETAILED DESCRIPTION

Figure 1:
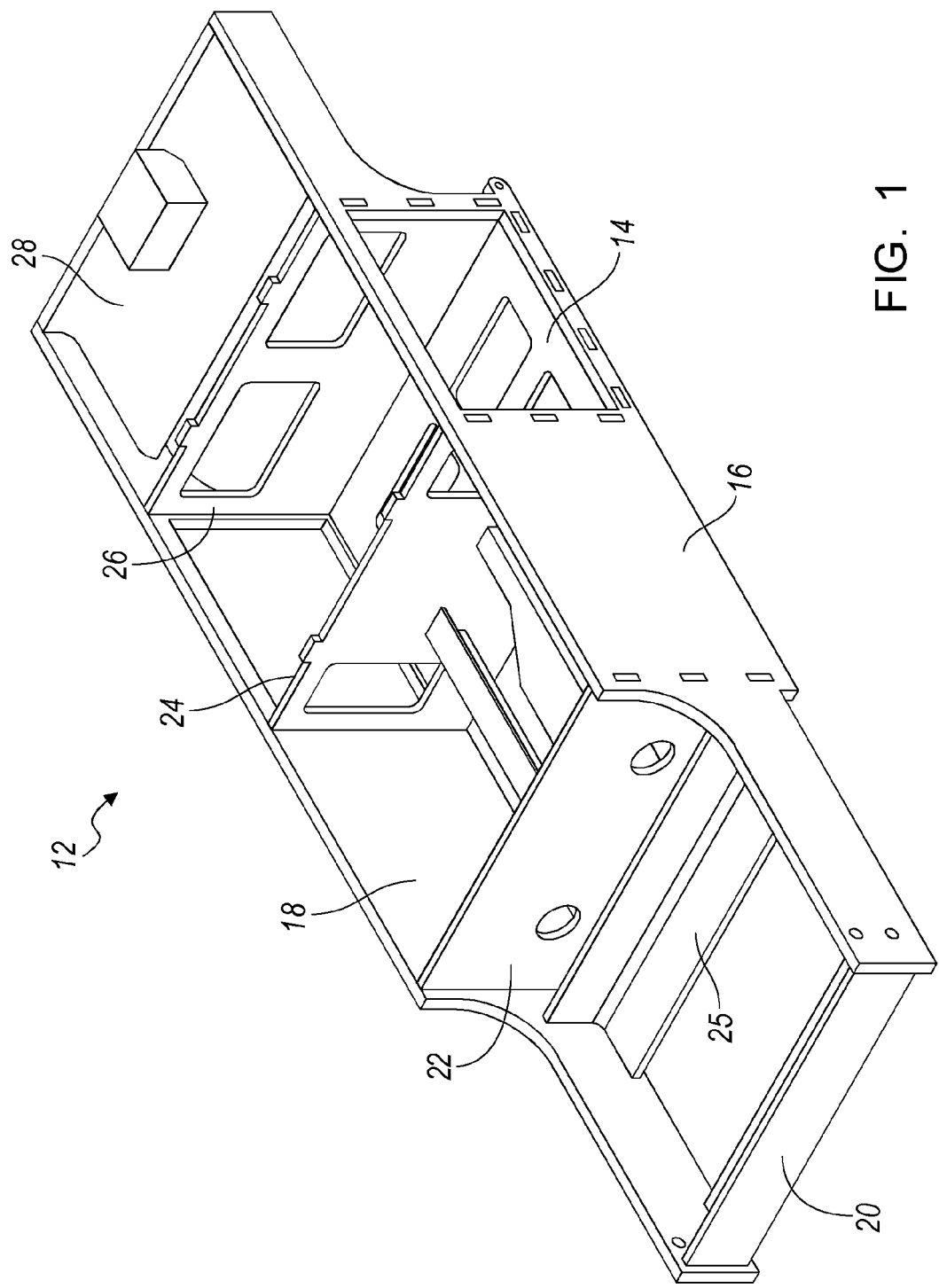
FIG. 1 is a perspective view of a chassis for the vehicle.

Referring now to the drawings, there is illustrated in FIG. 1 a chassis 12 for an automated guided vehicle. The chassis includes a floor 14, body side panels 16, 18, bulkheads 20, 22, 24, 26 and equipment support tray 28. The chassis 14 is formed of sheet metal, preferably steel, and its components are joined by fasteners such as rivets and bolts, welds or a combination of these.

Figure 2:
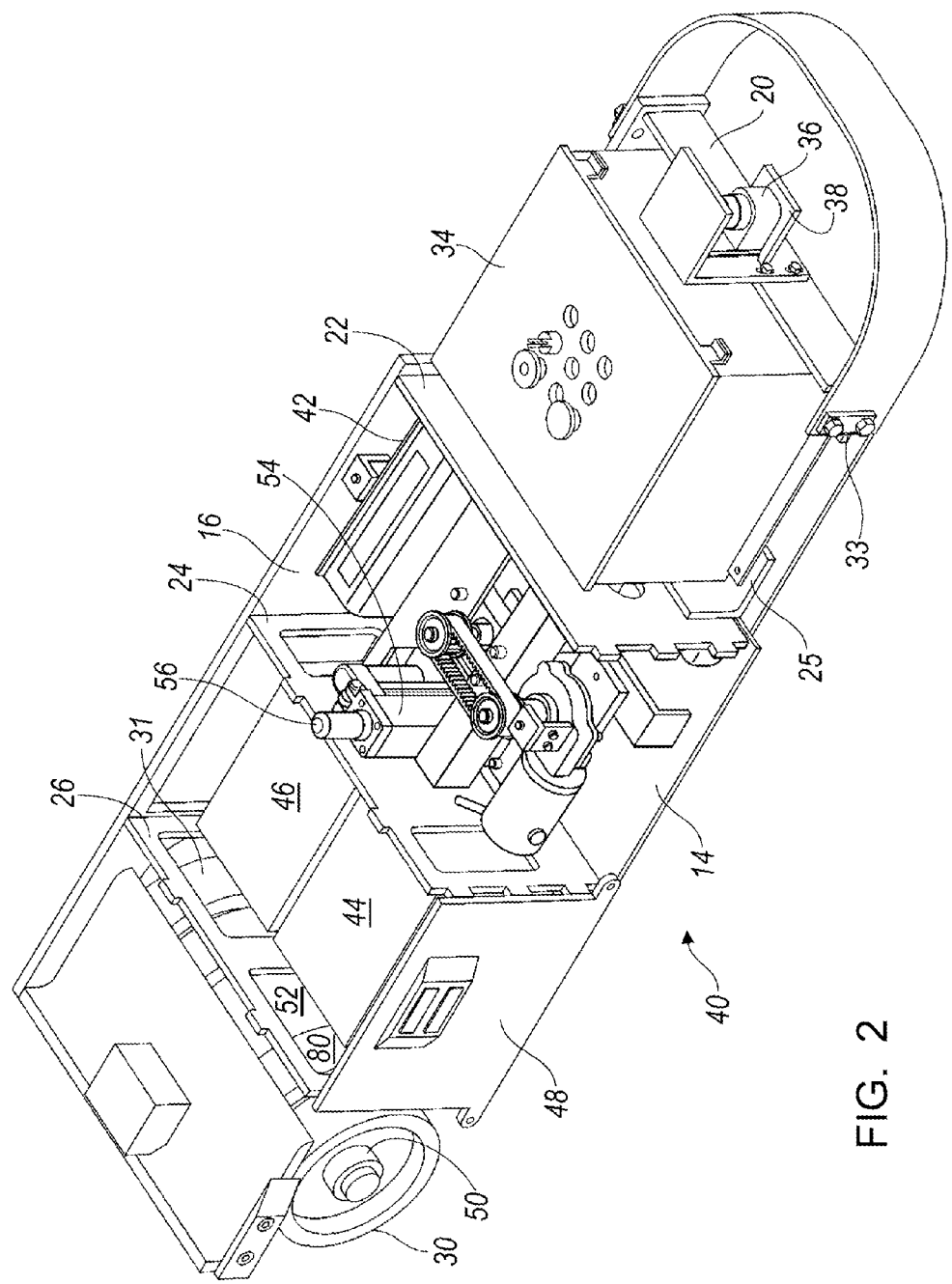
FIG. 2 is a perspective view showing mechanical and electronic control equipment installed in the chassis of FIG. 1.
Figure 3:
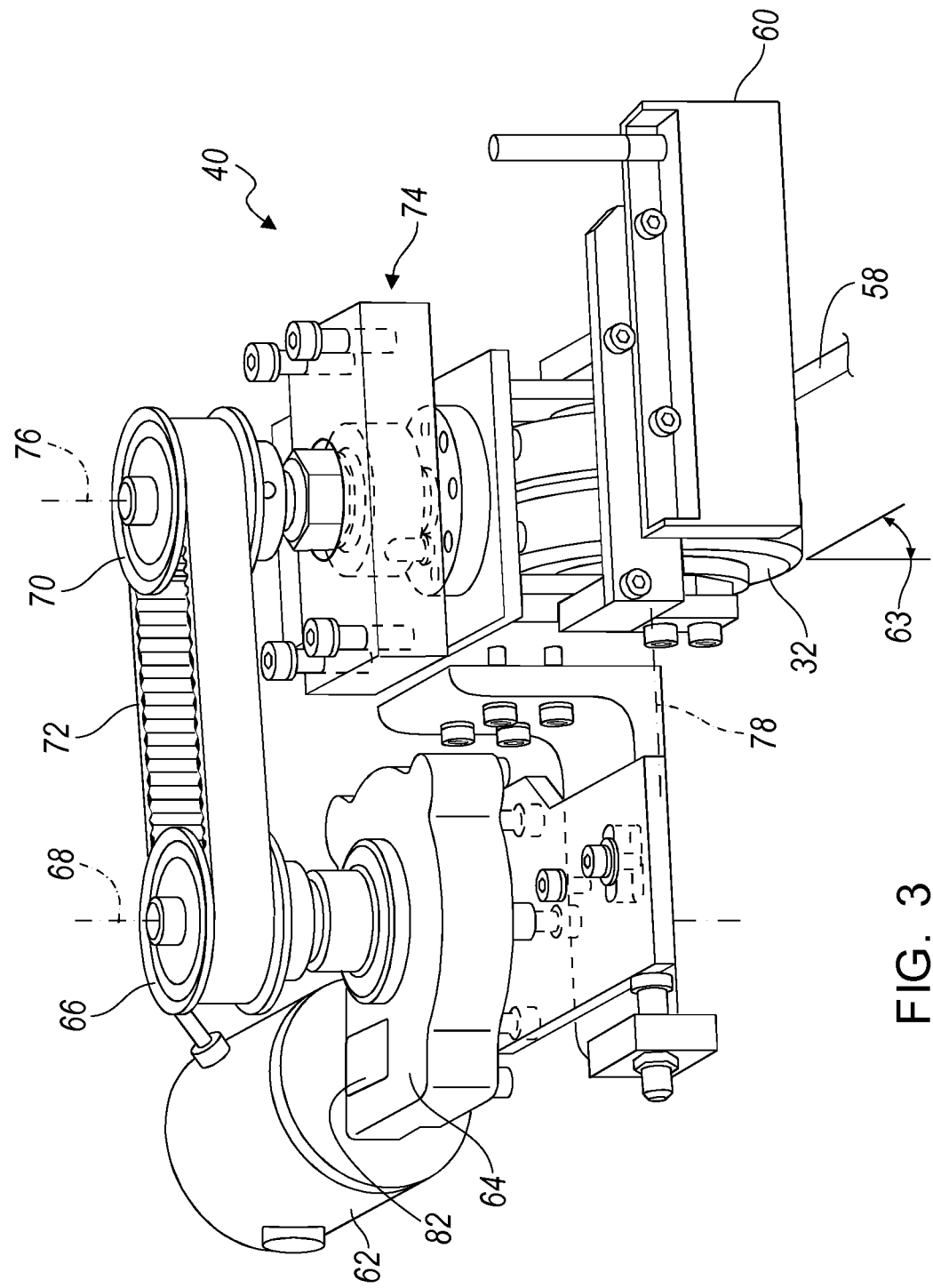
FIG. 3 is a perspective view of the vehicle's steering assembly.

FIGS. 2 and 3 illustrate the automated guided vehicle 28 with its chassis 12 supported on driven rear wheels 30, 31 and a front steerable wheel 32. A controller 34 is supported in a first bay between bulkheads 20, 22 on trays 25, 35. A scanner 36 is supported on a bracket 38 secured to the front of bulkhead 20. A guidance and steering subassembly 40 is supported in a second bay between bulkheads 22, 24 on the vehicle floor A battery charger 42 is supported in the second bay between bulkheads 22, 24 on the vehicle floor 14. Rechargeable electric storage traction batteries 44, 46, located between bulkheads 24, 26, are supported on the vehicle floor 14. A battery charge plate 48 is secured to the outer surface of side panel 18 between the planes of bulkheads 24, 26.

The input of a transaxle 50 is driveably connected to an electric motor 52, whose power source is the batteries 44, 46, and the transaxle output is driveably connected to the axles of rear wheels 30, 31.

A shot pin subassembly 54, located between bulkheads 22, 24 and secured to and supported on the vehicle's floor 14, includes a pin 56 that is extended and retracted by electric actuation such as an electric cylinder. With the pin 56 retracted, the vehicle 28 is driven under a load, such as a vehicle body or vehicle components to be transported to a destination. The pin is then extended about 2 to 3 inches into engagement with the undersurface of the load, and the vehicle is driven to the destination towing the load. Pin 56 is of steel and has a diameter of about 1.25 inches.

Scanner 36 is an optical device that continually looks forward to detect the presence of obstacles in the path of the vehicle, such as equipment, a fork truck or personnel. Scanner 36 emits an infrared frequency wave, receives waves that reflect from such obstacles, and communicates with controller 34, which slows the vehicle speed, stops the vehicle or steers the vehicle away from the obstacle in response to signals transmitted from the scanner to the controller.

The guidance and steering subassembly 40 includes a tape sensor 60, which tracks a magnetic tape or wire 58 secured to the floor of the area in which the vehicle is operating; a steering motor 62 electrically connected to the batteries 44, 46; a mechanical drive unit 64, driveably connected to the shaft of steering motor 62 for driving a pulley 66 in rotation about an outright axis 68, a driven pulley 70; a drive belt 72 engaged with the pulleys 66, 68; and a mechanism 74 for converting rotation about axis 76 to rotation about the lateral axis 78 of the front wheel 32.

Tape sensor 60 comprises multiple Hall-effect sensors, which produce electromagnetic signals indicating to the controller 34 deviations of the vehicle 28 from the location of the magnetic tape or magnetic wire secured to the factory floor. The magnetic tape or magnetic wire defines the appropriate path for the vehicle as it drives about the surface. A steering motor controller 82 actuates the steering motor 62 to return the vehicle to dead center alignment with the magnetic tape or magnetic wire 58. Steering motor 62 changes the angular position 63 of the steerable wheel 32 in response to signals produced by sensor 60 and transmitted to the controller.

Controller 34 is preferably a programmable logic controller (PLC), i.e., a digital computer used for automation of electromechanical processes, such as control of machinery on factory assembly lines. A PLC has multiple input and output arrangements, wide temperature operating ranges, immunity to electrical noise, and resistance to vibration and impact. Computer programs to control machine operation are typically stored in battery-backed or non-volatile electronic memory.

Controller 34 communicates with the factory computer system and is responsible for overall performance of vehicle 28 including control of its speed and start and stop functions, monitoring state of charge of batteries 44, 46, etc. In addition to controller 34, the vehicle control system comprises a motor controller 80, which controls the traction drive motor 52, and a motor controller 82, which controls the guidance and steering subassembly motor 62. Each of the motor controllers 80, 82 and the PLC 34 communicate over an electronic communications network on board the vehicle 28.

While certain embodiments of the present invention have been described in detail, those familiar with the art to which this invention relates will recognize various alternative designs and embodiments for practicing the invention as defined by the following claims.

What is claimed is:

1. A vehicle for transporting material along a defined path, comprising:
    a chassis including first and second bulkheads spaced mutually along a first length of the chassis, the first and second bulkheads defining a first bay therebetween, a third bulkhead spaced along a second length of the chassis from the second bulkhead, the second and third bulkheads defining a second bay therebetween, a fourth bulkhead spaced along a third length of the chassis from the third bulkhead, the third and fourth bulkheads defining a third bay therebetween;
    a source of electric power mounted on the chassis in the third bay;
    nonsteerable rear wheels supporting the chassis;
    a steerable wheel located between the first and third bays;
    a traction system including a traction motor connected to the power source for driving the nonsteerable rear wheels;
    a steering system located in the second bay including a steering motor connected to the power source for adjusting an angular position of the steerable wheel; and
    a controller located in the first bay for adjusting the vehicle's speed and direction by controlling operation of the traction motor and steering motor in response to information regarding the vehicle's location and travel direction relative to the path.

2. The vehicle of claim 1 further comprising:
    a path indicator secured to a surface on which the vehicle travels;
    a sensor that monitors a position of the vehicle relative to the indicator and communicates said position to the controller.

3. The vehicle of claim 2 wherein the sensor is a Hall-effect sensor.

4. The vehicle of claim 1 further comprising a scanner that determines presence of an obstacle ahead of the vehicle and communicates said determination to the controller.

5. The vehicle of claim 4 wherein the scanner is an optical scanner that emits waves having a frequency in the infrared range.

6. The vehicle of claim 1 wherein the source of electric power is a rechargeable electric storage battery.

7. The vehicle of claim 1 wherein the steering system further includes:
    a drive pulley driveably connected to the steering motor;
    a driven pulley driveably connected to the steerable wheel; and
    a flexible member driveably engaged with the drive pulley and the driven pulley.

8. The vehicle of claim 7 further comprising:
    a path indicator secured to a surface on which the vehicle travels;
    a sensor that monitors a position of the vehicle relative to the indicator; and
    wherein the controller further comprises a steering motor controller that changes an angular position of the steerable wheel and maintains the vehicle on the path in response to information produced by the sensor.

9. The vehicle of claim 1 wherein:
    the traction system further includes a scanner that determines presence of an obstacle ahead of the vehicle; and
    the traction motor is driveably connected to the driven wheels, and
    the controller further comprises a traction motor controller that changes a speed of the traction motor and the driving wheels in response to information produced by the scanner.

10. A vehicle for transporting material along a defined path, comprising:
    a chassis including first and second bulkheads spaced mutually along a first length of the chassis, the first and second bulkheads defining a first bay therebetween, a third bulkhead spaced along a second length of the chassis from the second bulkhead, the second and third bulkheads defining a second bay therebetween, a fourth bulkhead spaced along a third length of the chassis from the third bulkhead, the third and fourth bulkheads defining a third bay therebetween;
    a sensor secured to the first bulkhead for monitoring a position of the vehicle relative to a path indicator secured to a surface on which the vehicle travels;
    a source of electric power mounted on the chassis in the third bay;
    nonsteerable rear wheels supporting the chassis and located behind the third bay;
    a traction system including a traction motor connected to the power source for driving the nonsteerable rear wheels; and
    a steering system located in the second bay, including a steerable wheel and a steering motor connected to the electric power source for adjusting an angular position of the steerable wheel relative to the path indicator.

11. The vehicle of claim 10, further comprising:
    a controller located in the second bay for adjusting the vehicle's speed and direction by controlling operation of the traction motor and steering motor in response to information regarding the vehicle's location and travel direction relative to the path indicator.

12. The vehicle of claim 10 wherein the sensor is a Hall-effect sensor.

13. The vehicle of claim 10 further comprising a scanner that determines presence of an obstacle ahead of the vehicle.

14. The vehicle of claim 13 wherein the scanner is an optical scanner that emits waves having a frequency in the infrared range.

15. The vehicle of claim 10 further comprising a shot pin assembly comprising an extendable and retractable pin that alternately engages and disengages a load towed by the vehicle when the pin is engaged with the load.

16. The vehicle of claim 10 wherein the steering system further includes:
    a drive pulley driveably connected to the steering motor;
    a driven pulley driveably connected to the steerable wheel; and a flexible member driveably engaged with the drive pulley and the driven pulley.

17. The vehicle of claim 10, further comprising:
a steering motor controller that changes an angular position of the steerable wheel and maintains the vehicle on the path in response to information produced by the sensor.

18. A vehicle for transporting material along a defined path, comprising:
a chassis including first and second bulkheads spaced mutually along a first length of the chassis, the first and second bulkheads defining a first bay therebetween, a third bulkhead spaced along a second length of the chassis from the second bulkhead, the second and third bulkheads defining a second bay therebetween, a fourth bulkhead spaced along a third length of the chassis from the third bulkhead, the third and fourth bulkheads defining a third bay therebetween;
a sensor that monitors a position of the vehicle relative to the path;
a scanner that determines presence of an obstacle ahead of the vehicle, the scanner secured to the first bulkhead;
a source of electric power mounted on the chassis in the third bay;
nonsteerable wheels supporting the chassis and located longitudinally rearward of the source of electric power;
a steerable wheel;
a traction system including a traction motor connected to the power source for driving the nonsteerable wheels; and
a steering system located in the second bay, including a steering motor connected to the power source for adjusting an angular position of the steerable wheel about a first axis that intersects a second axis about which the steerable wheel rotates.

19. The vehicle of claim 18, further comprising:
a controller located for adjusting the vehicle's speed and direction by controlling operation of the traction motor and steering motor in response to information regarding the vehicle's location and travel direction relative to the path.

20. The vehicle of claim 18 wherein the steering system further includes:
a drive pulley driveably connected to the steering motor;
a driven pulley driveably connected to the steerable wheel; and
a flexible member driveably engaged with the drive pulley and the driven pulley.

* * * * *